United States Patent
Scherzer et al.

(10) Patent No.: US 8,347,910 B2
(45) Date of Patent: Jan. 8, 2013

(54) WATER REFILLING PLUG FOR BATTERY CELLS

(75) Inventors: Klaus Scherzer, Dachau (DE);
Hermann Stauff, Willich (DE)

(73) Assignee: Oschmann GbR, Schondorf (DE)

( * ) Notice: Subject to any disclaimer, the term of this patent is extended or adjusted under 35 U.S.C. 154(b) by 620 days.

(21) Appl. No.: 12/527,419

(22) PCT Filed: Apr. 1, 2008

(86) PCT No.: PCT/EP2008/053885
§ 371 (c)(1),
(2), (4) Date: Sep. 27, 2009

(87) PCT Pub. No.: WO2009/121402
PCT Pub. Date: Oct. 8, 2009

(65) Prior Publication Data
US 2010/0323227 A1   Dec. 23, 2010

(51) Int. Cl.
*F16K 31/18* (2006.01)
(52) U.S. Cl. .......................... 137/430; 137/436
(58) Field of Classification Search ............ 137/260, 137/430, 436, 808, 812, 813
See application file for complete search history.

(56) References Cited

U.S. PATENT DOCUMENTS

| 4,386,141 A * | 5/1983 | Weidner et al. ............... 429/64 |
| 5,803,138 A | 9/1998 | Oschmann et al. |
| 7,234,489 B2 * | 6/2007 | Bowe et al. .................. 137/813 |
| 2006/0269832 A1 * | 11/2006 | Hutchinson ................. 429/74 |

FOREIGN PATENT DOCUMENTS

DE   29519146   3/1996

OTHER PUBLICATIONS

WIPO, International Search Report, Jul. 14, 2008.

* cited by examiner

*Primary Examiner* — John Rivell
*Assistant Examiner* — Hailey K Do
(74) *Attorney, Agent, or Firm* — Themis Law

(57) ABSTRACT

A water refilling plug for automatically filling battery cells has a cylindrical plug housing that includes a connector fitting for water delivery into a housing, as well as a valve, actuated by a float, having an annular valve body and a conical valve seat. The valve is arranged between an inflow channel and an outflow channel leading into the battery cell. In accordance with the invention, swirl-generating deflection channels are arranged between the annular inflow channel and the conical valve seat in a pattern distributed over a circumference in the plug.

3 Claims, 4 Drawing Sheets

WATER REFILLING PLUG FOR BATTERY CELLS

FIELD OF THE INVENTION

The invention relates to a water refilling plug for automatically filling battery cells.

BACKGROUND OF THE INVENTION

European Patent EP-B 763 262 discloses a filling apparatus for filling battery cells of the species indicated, in which apparatus the water is directed, behind the connector fitting, on a U-shaped upward path that acts as a siphon, to a spillover partition, from whence it travels through a lateral overflow channel under the open valve body.

A refilling plug of this kind, and plugs of similar design, serves for automatically refilling battery cells with distilled water. This is brought about in practical terms substantially using three different methods:

1. By means of gravity-fed water from a tank that is attached at a specific height above the battery to be filled. The outflow opening of the tank is connected via a quick-connect coupling to the filling system that is mounted above the battery surface, and the installed refilling plugs control water inflow into the battery cells via a valve-and-float system.

2. By means of a pump, which is often driven by a motor at low voltage (approx. 12 volts) and provides water from a tank at a pressure of approximately 0.5 to 1.0 bar. The outflow opening of the pump is connected by means of a quick-connect coupling to the filling system, which is mounted on the battery surface. Here as well, the installed filler plugs control water inflow into the battery cells via a valve-and-float system.

3. By means of tap water from the public water system. In this case the water pressure (approx. 4 bar) available from the public water system is used as filling pressure, and after prior preparation of the water by means of an ion exchanger, the water is connected via a quick-connect coupling to the filling system, which is mounted on the battery surface. A valve-and-float system controls water inflow through the filler plugs into the battery cells.

The above three examples indicate that a filling system must be used, and must function, under a wide variety of conditions. The object underlying the invention is therefore that of making available a water refilling plug that works reliably at all practically occurring pressures, so that it can be used without difficulty not only for very low filling pressures, but also for relatively high pressures.

SUMMARY OF THE INVENTION

To achieve this object, provision is made according to the present invention that in the context of the water refilling plug of the species indicated, swirl-generating deflection channels are arranged, in a manner distributed over the circumference, between the annular inflow channel and the conical valve seat.

As a result, a rotary motion is imparted in controlled fashion, via the deflection channels, to the water before it reaches the valve. This circular motion of the water stream generates a suction that has its highest rotational velocity in the peripheral region, and behaves neutrally at its core. The circular motion of the outflowing water provides the momentum for the closing operation of the valve body, so that the closing operation proceeds very exactly, in self-regulating fashion, and almost identically in all pressure ranges.

In one embodiment of the invention, the deflection channels are recessed into a valve cylinder attached centeredly in the housing, and open substantially tangentially into its interior space above the valve seat. In a preferred embodiment, the deflection channels proceed obliquely upward from the annular inflow channel.

BRIEF DESCRIPTION OF THE DRAWINGS

Additional features and advantages are evident from the description below of an exemplifying embodiment that is depicted in the drawings, in which.

DETAILED DESCRIPTION OF THE INVENTION

Figure 1:
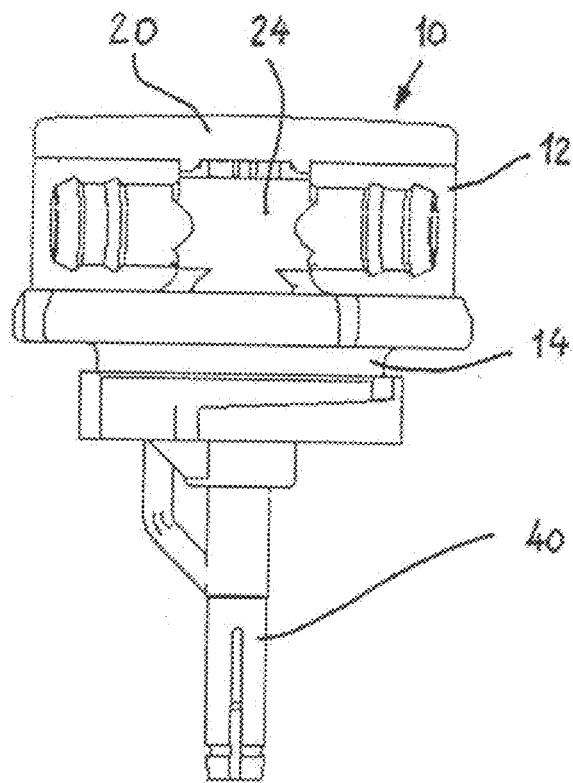
FIG. 1 is a side view of a water refilling plug in accordance with the invention.
Figure 2:
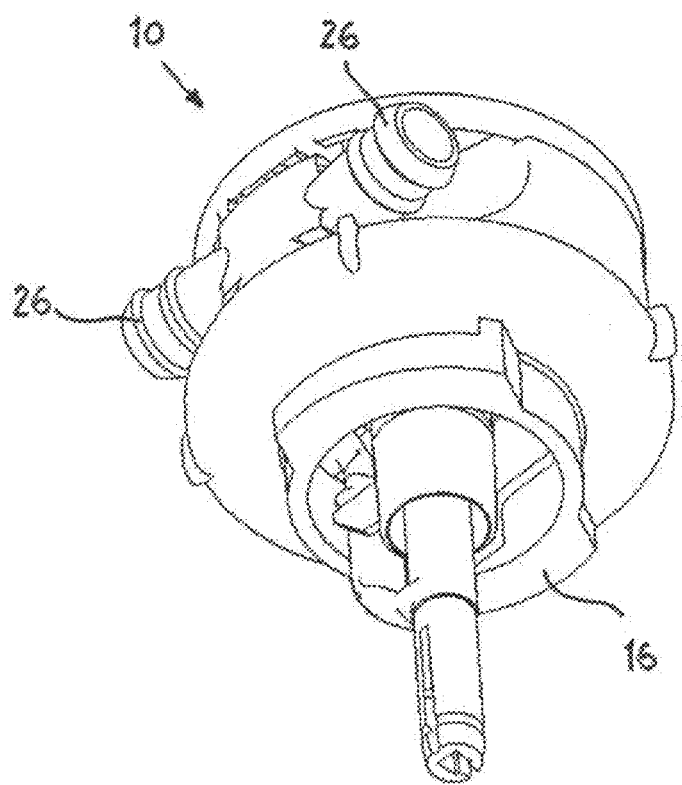
FIG. 2 is a perspective view from below of the plug of FIG. 1.
Figure 3:
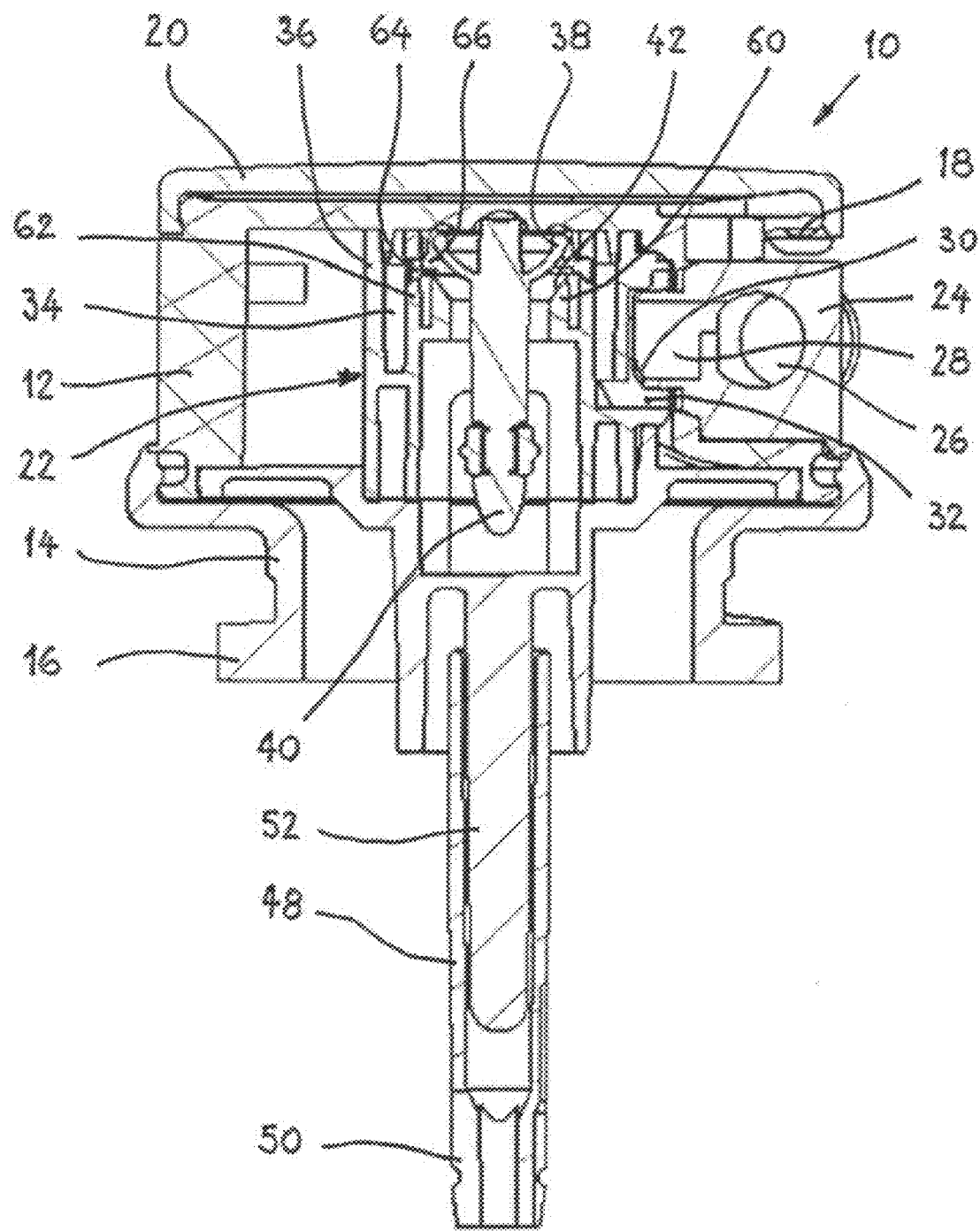
FIG. 3 is a longitudinal section through the refilling plug.
Figure 4:
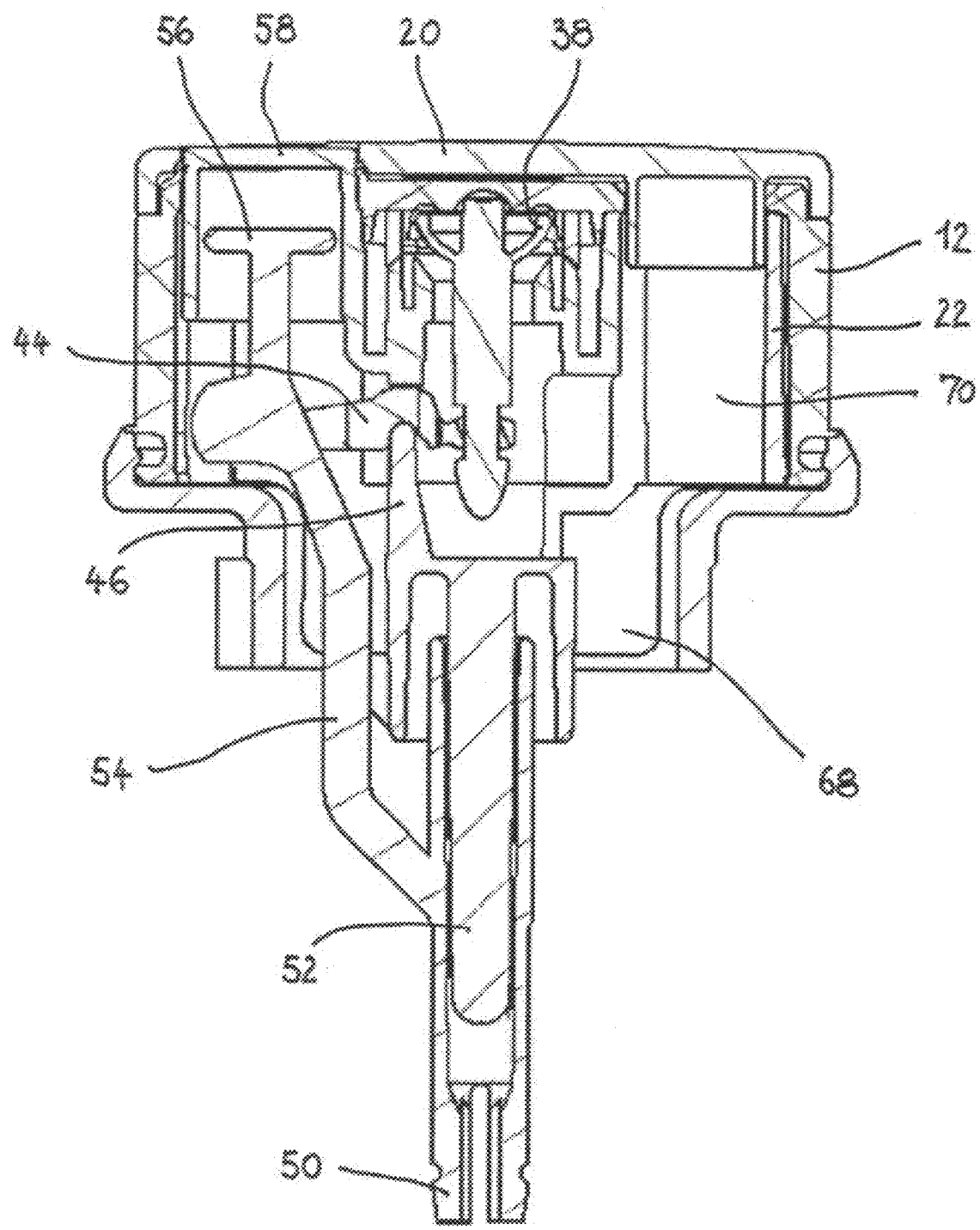
FIG. 4 is a section, rotated 90° as compared with FIG. 3, through the refilling plug.

Water refilling plug 10, depicted externally in FIGS. 1 and 2, may be used for the automatic introduction of water into battery cells, and has a cylindrical plug housing 12 that, in accordance with FIGS. 3 and 4, is joined by snap engagement to a sleeve 14 that can be inserted into the refill opening of a battery cell (not shown). Fastening means 16, for example for bayonet connection in the refill opening of the battery cell, are shaped onto the sleeve 14. A cover 20 is articulated at the upper end of plug housing 12 via a hinge 18.

As shown in FIG. 4, inserted into plug housing 12, which may be manufactured from plastic, is an inner housing 22 that is manufactured as an injection-molded part from a transparent plastic in one or two pieces. Joined thereto or integrally configured therewith, on one side, is a T-shaped connector piece 24 (see FIG. 5) that carries two horizontal connector fittings 26 for water delivery and for conveying water on to the adjacent battery cell. It is further evident from FIG. 3 that connector fitting 26 for water delivery leads into an entry chamber 28, and from that via a connecting opening 30 into a prechamber 32. Prechamber 32 in turn leads from below into an annular inflow channel 34 that is shaped onto the outer side of a valve cylinder 36 that is part of inner housing 22.

Valve cylinder 36 is disposed centeredly within inner housing 22, and receives a centeredly mounted, vertically movable valve body 38 that is shaped onto the upper end of a vertical shaft 40 and is installed in suspended fashion. The annular valve body 38 has a cup shape that is open at the top and, with the valve in the closed state, rests on a conical valve seat 42 that is evident in FIGS. 3 and 4.

As FIG. 4 shows, the lower end of shaft 40 is connected, via a rocker lever 44 that is mounted on a rocker support 46, to a float rod 48 that is mounted centeredly in inner housing 22 in vertically displaceable fashion. Lower end 50 of float rod 48 serves for the fastening of a float (not shown). The hollow float rod 48 is mounted vertically movably on a downwardly projecting guide mandrel 52, and carries on one side an upwardly projecting rod 54 on which the long side of rocker lever 44 is mounted, and at whose upper end an indicating disk 56 is attached. Indicating disk 56 is visible through a circular window 58, which is part of the transparent inner housing 22, at the height of cover 20.

Located between valve cylinder 36 and an inner cylinder 60 of inner housing 22, on which cylinder conical valve seat 42 is embodied, is a cylinder wall 62 into which deflection channels 64, distributed over the circumference, are recessed at the height of valve seat 42. These proceed out from the annular inflow channel 34 obliquely with respect to the radial direction (see FIG. 5) and with an upward inclination (see FIG. 3), and, as shown in FIG. 5, open substantially tangentially into a valve interior space 66 above the conical valve seat 42.

It is apparent from FIG. 4 that when the valve is open, inflowing water travels out of the annularly embodied inflow channel 34 through the obliquely proceeding deflection channels 64 into interior space 66 located therebehind, from whence it flows via an outflow channel 68 below a cylindrical service opening 70 into the battery cell.

Figure 5:
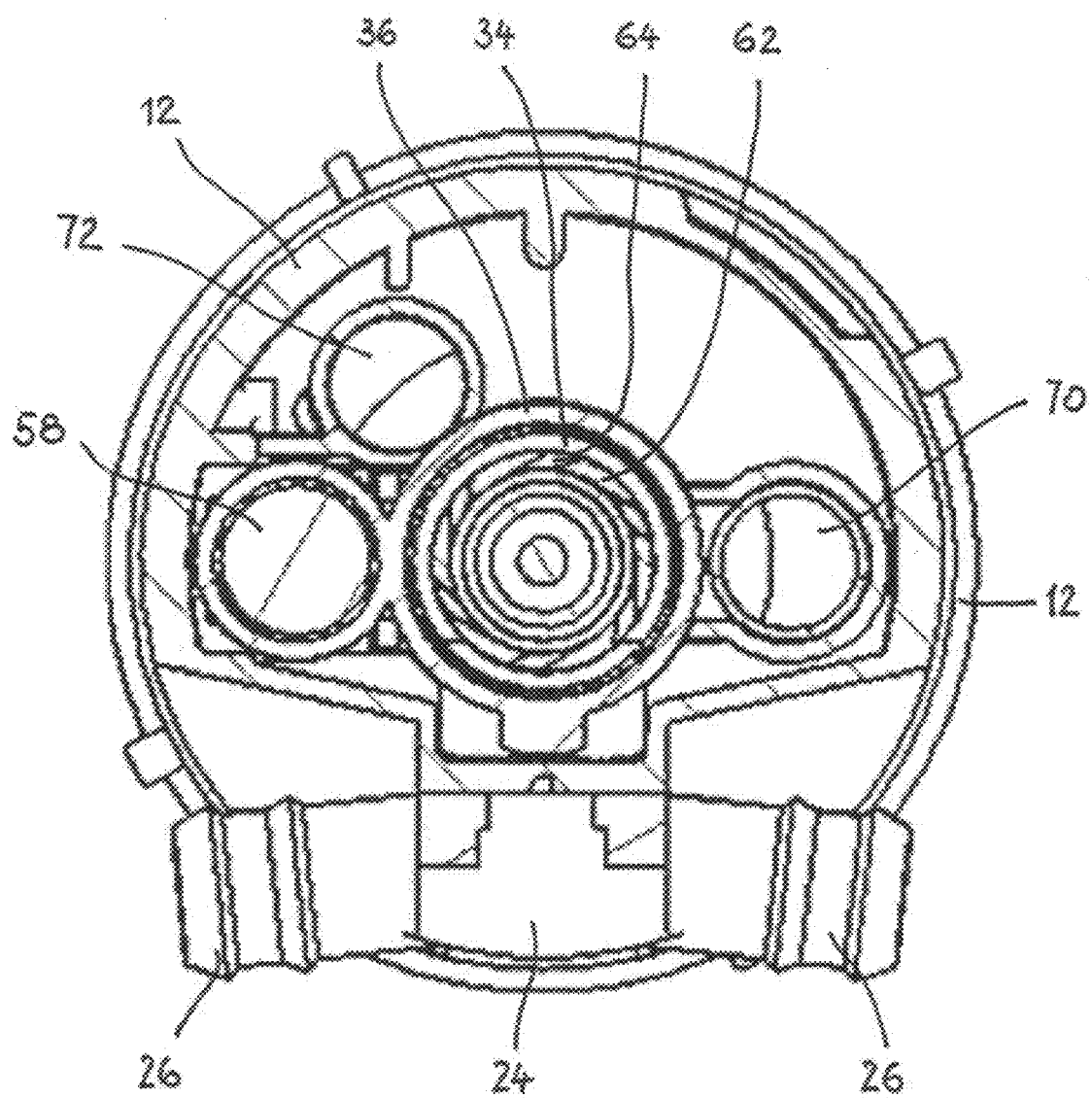
FIG. 5 is a horizontal section through the plug at the height of the deflection channels.

Service opening 70 for introduction of a measurement probe or the like, located diametrically opposite indicating disk 56, as well as a venting cylinder 72, can be seen in FIG. 5.

When the required water fill level in the battery cell is reached, the float (not depicted) lifts float rod 48, and with it rod 54 protruding laterally therefrom, upward so that shaft 40, and thus valve body 38, are pulled downward by the short arm of rocker lever 44. The water flowing in turbulently via deflection channels 64 travels onto the upper side of the plate- or cup-shaped valve body 38 and pushes it into its closed position on valve seat 42.

Deflection channels 64, provided and oriented according to the present invention, impart to the water flowing in from inflow channel 34 a swirl that, when valve body 38 is raised and open, on the one hand accelerates the filling operation and on the other hand assists the closing motion in the valve's closing phase. The greatest possible flexibility in terms of filling speed and filling pressure is thereby achieved, during both filling and closing of the system. As already mentioned, the rotating motion of the outflowing water generates a suction, with the result that the outflowing water generates the momentum for the closing operation regardless of the filling pressure, and automatically regulates the closing operation. A further advantage of the invention consists in an increased self-cleaning effect in the region of the water outflow, because of the centrifugal forces generated by the swirl.

The invention claimed is:

1. A water refilling plug for automatically filling battery cells comprising:
    a cylindrical plug housing;
    a connector fitting coupled to the cylindrical plug housing for water delivery into the cylindrical plug housing; and
    a valve having an annular valve body and a conical valve seat, the valve being arranged between an inflow channel and an outflow channel leading into a battery cell;
    wherein swirl-generating deflection channels are recessed into a cylinder wall of the valve over a circumference of the wall between the inflow channel and the conical valve seat,
    wherein the cylinder wall is located between a valve cylinder centeredly attached in the cylindrical plug housing, and an inner cylinder on which the conical valve seat is provided, the swirl-generating deflection channels proceeding obliquely with respect to a radial direction of the cylinder wall and opening substantially tangentially into an inner space of the valve cylinder above the valve seat, and
    wherein the swirl-generating deflection channels proceed obliquely upward from the inflow channel.

2. The water refilling plug according to claim 1, wherein the valve body is disposed in suspended fashion and is shaped onto an upper end of a vertical shaft having a lower end connected, via a rocker lever, to a float rod mounted centeredly in the cylindrical plug housing in vertically displaceable fashion.

3. The water refilling plug according to claim 1, wherein the inflow channel is part of the valve cylinder and is in communication with the connector fitting via a prechamber.

* * * * *